United States Patent
Cassoli et al.

(10) Patent No.: US 6,868,957 B2
(45) Date of Patent: Mar. 22, 2005

(54) APPARATUS FOR THE TRANSFER OF A PRODUCT BETWEEN TWO ANGULARLY SPACED CONVEYOR LINES

(75) Inventors: Stefano Cassoli, Casalecchio di Reno (IT); Luca Baldanza, Casalecchio di Reno (IT); Andrea Cinotti, Bologna (IT)

(73) Assignee: KPL Packaging S.p.A. (IT)

( * ) Notice: Subject to any disclaimer, the term of this patent is extended or adjusted under 35 U.S.C. 154(b) by 0 days.

(21) Appl. No.: 10/472,934

(22) PCT Filed: Jan. 23, 2003

(86) PCT No.: PCT/EP03/00665

§ 371 (c)(1),
(2), (4) Date: Sep. 26, 2003

(87) PCT Pub. No.: WO03/064303

PCT Pub. Date: Aug. 7, 2003

(65) Prior Publication Data

US 2004/0104098 A1 Jun. 3, 2004

(30) Foreign Application Priority Data

Jan. 31, 2002 (IT) .................................... BO2002A0051

(51) Int. Cl.$^7$ .............................................. B65G 47/22
(52) U.S. Cl. ............................. 198/370.08; 198/457.01; 198/468.11
(58) Field of Search ........................ 198/370.07, 370.08, 198/457.01, 457.06, 457.07, 597, 732, 468.9, 468.11

(56) References Cited

U.S. PATENT DOCUMENTS

| 3,036,692 A | 5/1962 | Kiefer, Sr. |
| 3,166,181 A | 1/1965 | Rutkus et al. |
| 3,533,519 A | * 10/1970 | Anderson ............... 198/457.05 |
| 3,900,096 A | * 8/1975 | Nack et al. ............ 198/457.03 |
| 5,094,337 A | 3/1992 | Van Veldhuisen et al. |

FOREIGN PATENT DOCUMENTS

JP          05178451 A   *  7/1993  .......... B65G/47/64

* cited by examiner

*Primary Examiner*—Eileen D. Lillis
*Assistant Examiner*—Mark A. Deuble
(74) *Attorney, Agent, or Firm*—Stites & Harbison PLLC; Marvin Petry

(57) ABSTRACT

The thrust bars (11), which are placed behind the product in the transfer phase from a first transport line (L1) to a downstream line (L2), have an adjustable stop (12) resting against the one side of the product in the direction of travel of this product. Articulated joints (10, 10'), connect the ends of the bars to corresponding points of the upper branch or the lower branch of a parallel pair of toothed belt conveyors (T, T') fed on pulleys with horizontal axles, which are inclined at a right angle to the conveyors (T,T') which bridge the area between the two transport lines and which with their one branch, work in the direction running from the upstream line to the downstream line at an identical speed to each other such as to be able to effect, with the above-mentioned bars, the transfer of products from one conveyor belt to the other by rear and side thrust. Guides (13, 13') are provided parallel to the conveyor (T) connected to the outer edge of the junction area of the conveyor lines to guide the right-hand edge of the product in the working direction during the transfer phase, particularly when this product is very long.

10 Claims, 2 Drawing Sheets

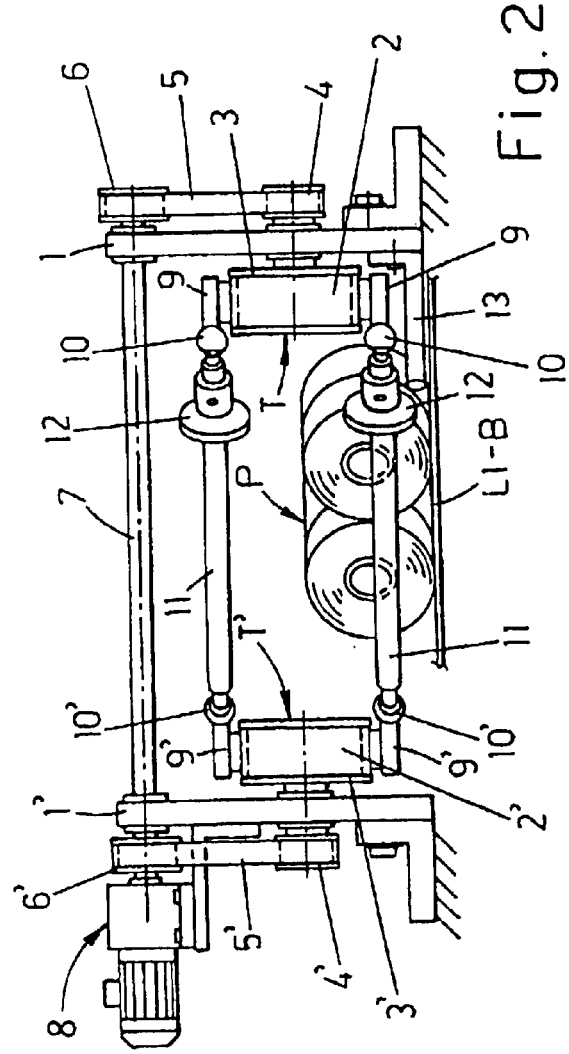
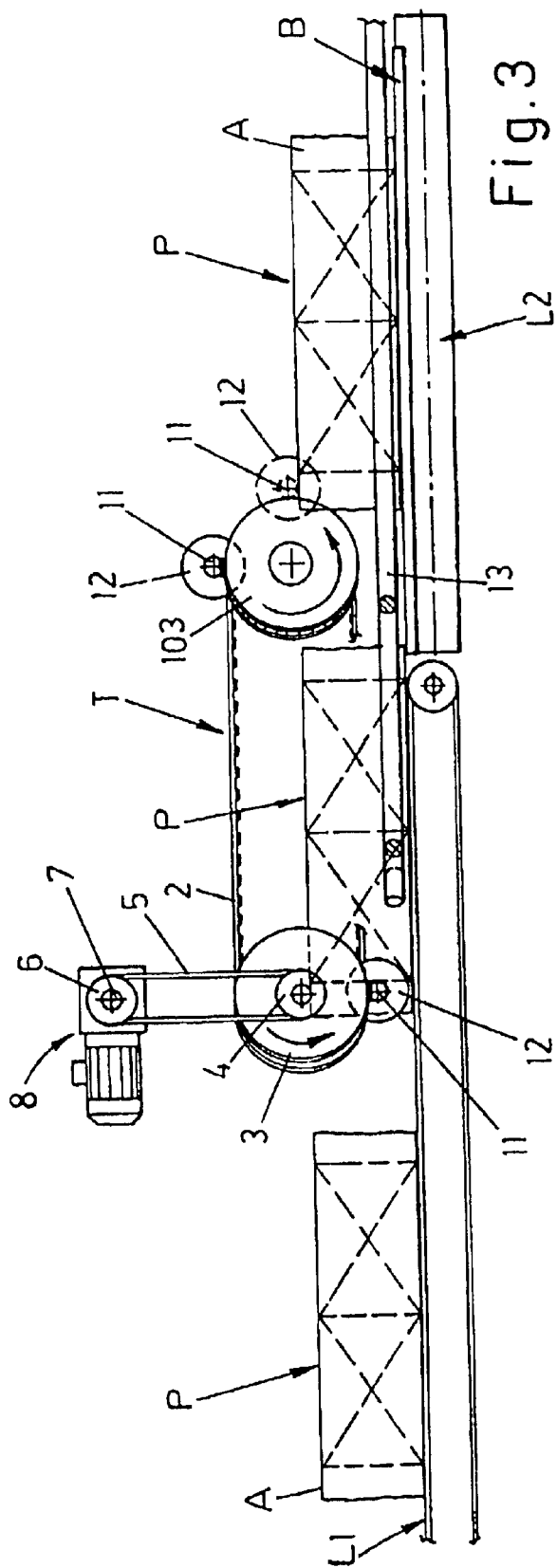

APPARATUS FOR THE TRANSFER OF A PRODUCT BETWEEN TWO ANGULARLY SPACED CONVEYOR LINES

DESCRIPTION

The invention concerns a structurally simplified and highly reliable device for transferring products in single file between two horizontal, consecutive and angularly spaced, e.g. at ninety degrees, conveyor lines without changing the orientation of this product. The device has industrial application in continuous machines of the so-called flow-pack type, for example, for the packaging of one or more paper rolls or other paper products in a thermoplastic tubular wrapping pack, which at first move forward in single file and parallel to the longitudinal axis of the tubular wrapping, after which they must be transferred to a conveyor line at ninety degrees without changing their spatial orientation. The second line moves the pack in single file arranged with the longitudinal axis of the tubular wrapping transverse to the direction of travel of this second line so that the opposite ends of each wrapper are arranged along the edges of this second line where equipment is working which makes provision for the folding and closure of the opposite flaps of the packs which are moving forward with a substantially continuous motion.

This transfer of packs from one line to the following one, to be carried out at speed and without the packs interfering with one another, is currently executed with belt conveyors which are nevertheless not capable of controlling the orientation of the transferred packs, so it is necessary to intercede with equipment which subsequently restores this orientation of the packs. To obviate this drawback, working with means comprising thrust units having an essentially L-shape is well-known; a great number of these, spaced equidistantly, are fixed overhanging to a recircling chain conveyor positioned obliquely and bridging the two successive conveyor lines. The above-mentioned thrust units are characterised by having the first section linked to the chains, which is parallel and which is moved parallel to the downstream conveyor line and by having the final section more overhanging and this remains parallel to the direction of travel of the upstream line. The thrust unit is attached to the conveyor chain with the possibility of rotating around the axis of its first section, which is connected by means of a connecting rod to a supplementary chain conveyor adjoining the main conveyor, offset therefrom and synchronised therewith, which has the purpose of always keeping the second section of the above-mentioned thrust units horizontal even in the return phase around the end pinions of the chain conveyors. The chain conveyors are moved in phase with the flow of packs on the upstream line so that when the said thrust units start to cover the lower branch of this conveyor, these thrust units are arranged with the first section behind the packs and the second section on the right-hand edge in the working direction of these packs. When the packs are taken over by the thrust units of the oblique conveyor, these packs leave the first conveyor line and reach a fixed running plane positioned co-planarly and bridging the two successive conveyor lines. The packs are moved by the thrust units in a composite shifting movement which is partly aligned to one and partly to the other conveyor line so that these packs remain in the original alignment when, at the end of the course, the said thrust units reach the initial part of the of downstream line which removes them, while these thrust elements are raised over the course of the return branch of the relevant conveyor sending them to the first conveyor line for the repetition of a subsequent cycle.

Since the thrust units must be able to be adapted to packs of different sizes, they are thick, of considerable length and their section which is parallel to the upstream conveyor line may have its overhang adjusted on the first section linked to overhang the drive conveyor. Excessive overhanging and the weight of the thrust unit causes fluctuations which may prejudice the functionality and/or operational safety in the equipment described over time.

The invention has the purpose of perfecting such equipment, simplifying it structurally, making it more easily adaptable to varying operating requirements and making it above all more reliable with the following idea for a solution. The thrust units are replaced by bars parallel to the direction of travel of the downstream conveyor line and connected at the end, by means of ball joints or articulated joints, at these points of the upper or lower branch of a pair of parallel positive type conveyors, e.g. toothed belts, staggered and inclined like the chain conveyors of the well-known apparatus described above and synchronously operated so as to move in the same direction and at the same speed. On each bar is fitted an adjustable transverse stop that, when this bar is arranged behind the pack to be transferred from one line to the next one, is placed on the right edge in that pack's direction so as to impart to it the transverse component of approach to the downstream line. The front end of the right side in the pack's direction of travel in the transfer phase, particularly if the pack itself is of considerable length, works together with appropriate means of guidance parallel to the lower branch of the said belt conveyors, which contribute to keeping this pack in the desired orientation.

Major characteristics of the invention and the benefits arising therefrom will appear more evident from the following description of a preferred form for its implementation, illustrated purely by way of a non-restrictive example in the figures of the two sheets of drawings in which:

FIGS. 2 and 3 illustrate the apparatus of FIG. 1 respectively in front elevation from the rear, as shown by the arrow K, and in side elevation, as indicated by the arrow H.

Figure 1:
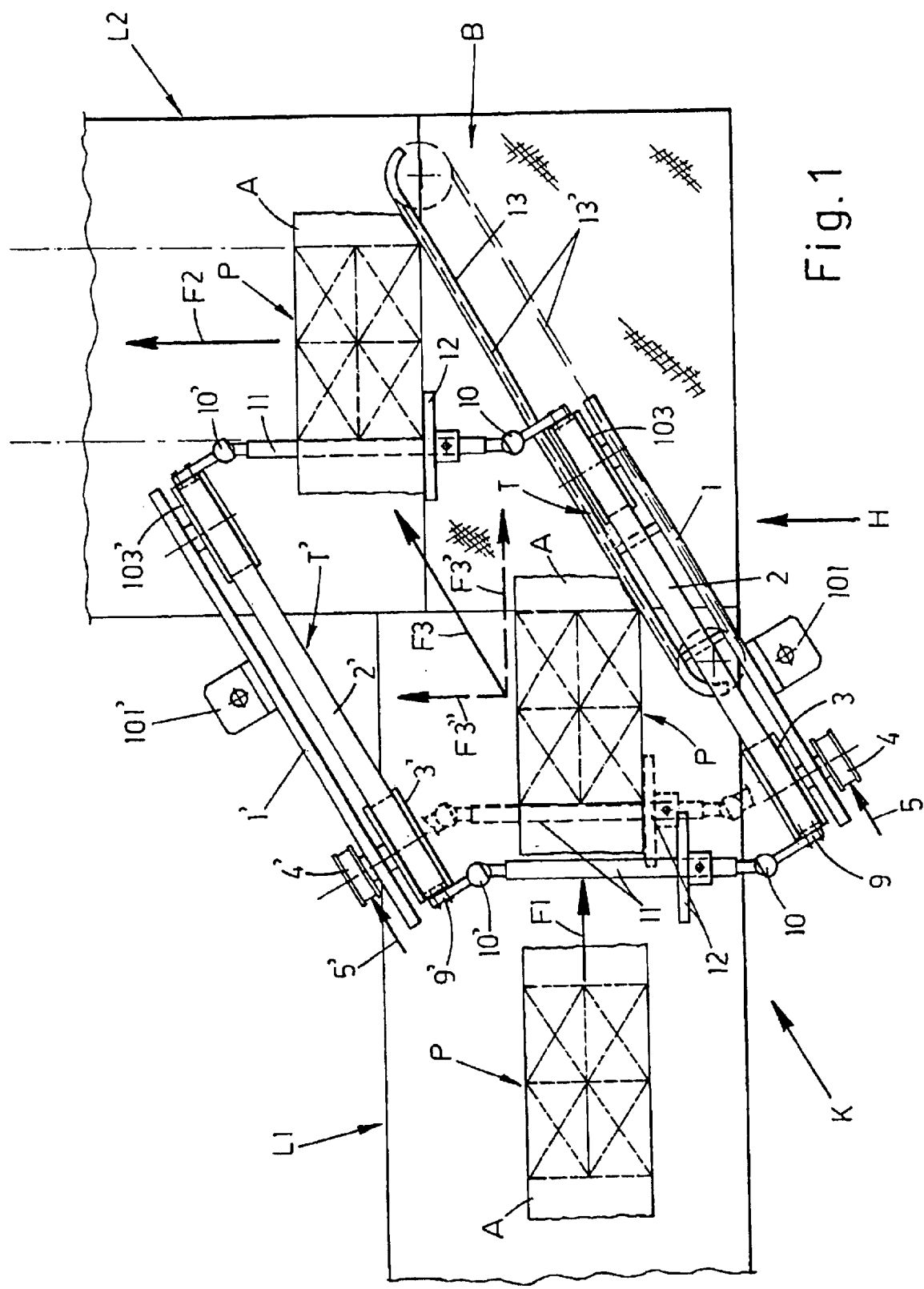
FIG. 1 is a schematic plan view from above of the apparatus involved.

In the FIGS. 1, 2 and 3 the upstream conveyor line working in the direction of the arrow F1 is indicated by L1 and the partly packed product P is placed on this line with the longitudinal axis of the tubular packaging A wrapping it parallel to the direction of travel of this line L1, while the conveyor line downstream of L1 is indicated by L2 which is angularly spaced from the line L1 at ninety degrees and works in the direction of the arrow F2 and on it the aforementioned packaged product P in tubular packaging A must be placed transversely with the longitudinal axis of the relevant wrapping so that the spatial orientation of this product in the packaging phase remains unchanged in the transfer from L1 to L2. Between the two lines which are co-planar, a fixed surface B having a low coefficient of friction for the product P with the packaging is positioned co-planarly with lines L1 and L2. The surface B may, for example, be coated with a suitable material for this purpose or may be formed of an air cushion plane. It is understood that the surface B may possibly be replaced by an extension of the upper branch of conveyor line L1, if formed, for example, of a belt crossing onto L2 and returned by a roller placed on the right side of the latter line.

Between the lines L1 and L2 are arranged at a correct linking inclination and laid out parallel to each other a pair of vertical abutments 1, 1' held up by flanks or shoulders 101, 101' and which in their turn support, with internal flanks, the respective horizontal axis conveyors T and T', of identical and positive type, formed for example of toothed belts 2, 2' fed on pulleys 3, 103 and 3', 103' fitted and revolving on the abutments 1, 1', and of which those 3, 3' have axles protruding from the external side of the said abutments and have keyed to them identical toothed pulleys 4, 4' which, by means of toothed belts 5, 5', are connected to likewise identical pulleys 6, 6' keyed to and rotating round a synchronization axle 7 and with a transverse disposition, e.g., from the high part of the flanks 1, 1' and which is connected at one end to a motive power source 8 that can be operated in phase with the products coming from the line L1. According to a structural variant, the axle 7 may derive motive power from one of the conveyor lines L1 or L2, e.g. by means of couplings controlled by opto-electronic equipment and/or other sensors monitoring the flow of product in the final part of the line L1. The flank 1' with the related conveyor T' is moved longitudinally sufficiently in advance of flank 1 with the conveyor T. The belts of the conveyors T and T' are arranged with their lower branch at a distance from the parts L1, B, L2 which is less than the height of the product to be transferred and move from L1 to L2 at an identical or adequate speed, e.g., slightly greater than that of L1 with the speed component aligned with that of line L1.

At a point of the belt of the conveyor T and at a corresponding and identical point of the belt of the conveyor T' are fixed supports 9, 9' which by means of ball joints or articulated joints 10, 10' support the ends of one of more equally spaced bars 11 parallel to the travel direction of the line L2. The apparatus shown in the drawings is for example equipped with two equally spaced bars 11 such that, when one of these is at the point of giving up a packed product onto the line L2, the other is at the point of picking up a packed product from the line L1. The bars 11 are preferably of round section and are coated with material with a low coefficient of friction compared with the packed product tubular packaging A and may possibly be equipped with a tubular, round and freely rotating part.

On each bar 11 is fixed—with the possibility of adjustment for changing the sizes of the packed products to be transferred and subsequently placed on the conveyor T—a transverse stop 12 comprised, for example, of a round plastic disc with rounded edges and with an external axial coupling which can slide on the bar 11 and may be fixed thereto with a radial grub screw.

The equipment is designed and operated in such a manner that in the section of the lower branch of the conveyors T and T', one of its bars 11 is placed behind a packed product supplied from the line L1 and also touches this product on the outside edge with the stop 12, all so that when moving from L1 to L2, this bar with the stop imparts to the packed product a composite shifting movement as per the arrow F3 with a component F3' aligned to L1 and with a component F3" aligned to L2 so that this product passes from one line to the other while remaining in the original orientation. If the packed product is relatively long, the possibility is foreseen of guiding its longitudinal orientation with its own front right-hand edge in the direction of travel sliding on a guide 13 close and parallel to the conveyor T, which is fixed, e.g., to the abutment 1 and produced with characteristics of great smoothness. As shown in FIG. 1 with the dashed line, the guide 13 may be replaced by one of the branches of one belt 13' fed at the ends on pulleys on vertical axles supported on the flank 1 and possibly motorized at the correct speed so that the said belt 13' correctly accompanies the packed product in the move from L1 to L2.

When the product reaches L2, the bar 11 with the rear stop 12 is lifted during the return of the belts 2, 2' around the pulleys 103, 103', so that this product may be easily removed by the conveyor action as per F2 exerted by the line L2 without interfering with the flank 1' or with the conveyor T'. During the run along the upper return branch of the conveyors T and T', the bar 11 and the stop 12, owing to an appropriate design of the return pulleys for these components, will be conveniently spaced from the packed product down below which moves forward under the elements 11, 12 as shown in FIGS. 2 and 3.

It is understood that the scope of protection of this patent application is also extended to that structural variant which makes provision for the conveyors T, T' being arranged in such a manner that they transfer the packed product from L1 to L2 with their upper branch, with the lower branch of these conveyors being placed beneath the ideal transit plane for the product from L1 to L2. In this instance the thrust bars complex 11, 12, after having transferred the packed product to the line L2, disappear beneath that line. Finally it is understood that the description refers to a preferred embodiment for the implementation of the invention, with the omission of structural details inherent to the equipment for the phased operation of the axle 7, any adjustment and safety devices since they are intuitable and can easily be produced by those of ordinary skill in the art. If the means of adjustment also make provision for changing the reciprocal distance of the flanks 1, 1', the thrust bars 11 could for example be produced in telescopic form for automatically changing their length.

What is claimed is:

1. Apparatus for the transfer of a product between two horizontal, consecutive and angularly spaced conveyor lines without changing the spatial orientation of that product, comprising:

thrust units parallel to the downstream line and recirculated by conveyor equipment with horizontal axes located between said conveyor lines; said thrust units, when travelling along one branch of the conveyor, being placed behind and on one side of the direction of travel of the product to be moved and transferred to the downstream line while keeping the product in its original spatial orientation, the thrust units comprising horizontal bars which have fixed to them a transverse stop for supporting the side of the products in the direction of travel, said bars being anchored at their ends by articulated joints, a pair of positive opposed conveyors with horizontal axes parallel to each other and longitudinally spaced apart in the direction of travel of the opposed conveyors, said opposed conveyors being activated so as to operate with their active branch running, in the direction from the upstream line to the downstream line and at an identical speed to each other and such that one of the said bars is placed behind the product supplied from the upstream line while the transverse stop of this bar is placed on one side of the same product, which is thus transferred from the first to the second conveyor line without changing its own spatial orientation.

2. Apparatus according to claim 1, the opposed conveyors comprising an external conveyor and an internal conveyor, and including straight guidance means parallel to the external conveyor to control the the front outside edge of the product being transferred.

3. Apparatus in accordance with claim 2, in which the guidance means comprises at least one straight guide with a low coefficient of friction in comparison with the product being transferred and is attached to a flank supporting the adjoining external conveyor.

4. Apparatus in accordance with claim 2, in which the guidance means comprises the straight branch of a belt conveyor with vertical axles motorized in the same direction and at the same speed as the lower branch of the adjoining conveyors whose flank also supports the said guide conveyor.

5. Apparatus in accordance with claim 1, in which the opposing conveyors are of the toothed belt type, fed on toothed pulleys supported and rotating on vertical flanks from whose outside edges the axles of one pulley of each opposed conveyor protrude for the connection via identical toothed pulleys and toothed belts to a synchronisation axle supported and rotating from the upper part of the said flanks above the aforesaid opposed conveyors and connected by one end to a device which drives the opposed conveyors in phase with the flow of products originating from the upstream line.

6. Apparatus in accordance with claim 1, in which the part of the thrust bars intended to come into contact with the product are of round section and are coated with a material having a low coefficient of friction compared with the product to be moved.

7. Apparatus in accordance with claim 6, in which the thrust bar is comprised wholly or at least in the part intended to come into contact with the product of a roller rotating freely on its own axle.

8. Apparatus in accordance with claim 1, in which the transverse stop is attached to and can be adjusted on each thrust bar and comprises a round disc with rounded edges and is fitted on the outside edge with an axial coupling with which it is fitted to slide along the said bar and which has a radially fitted screw for fixing on this bar.

9. Apparatus in accordance with claim 1, equipped with means for adjustment to differing dimensions for products to be moved, said means for adjustment providing for the possibility of changing the relative distance between the opposed conveyors.

10. Apparatus according to claim 9, in the thrust bars are constructed in telescopic form.

* * * * *